Sept. 9, 1958  J. H. HADDAD  2,851,402
GRANULAR SOLID TRANSFER METHOD AND APPARATUS
Filed June 1, 1954  3 Sheets-Sheet 2
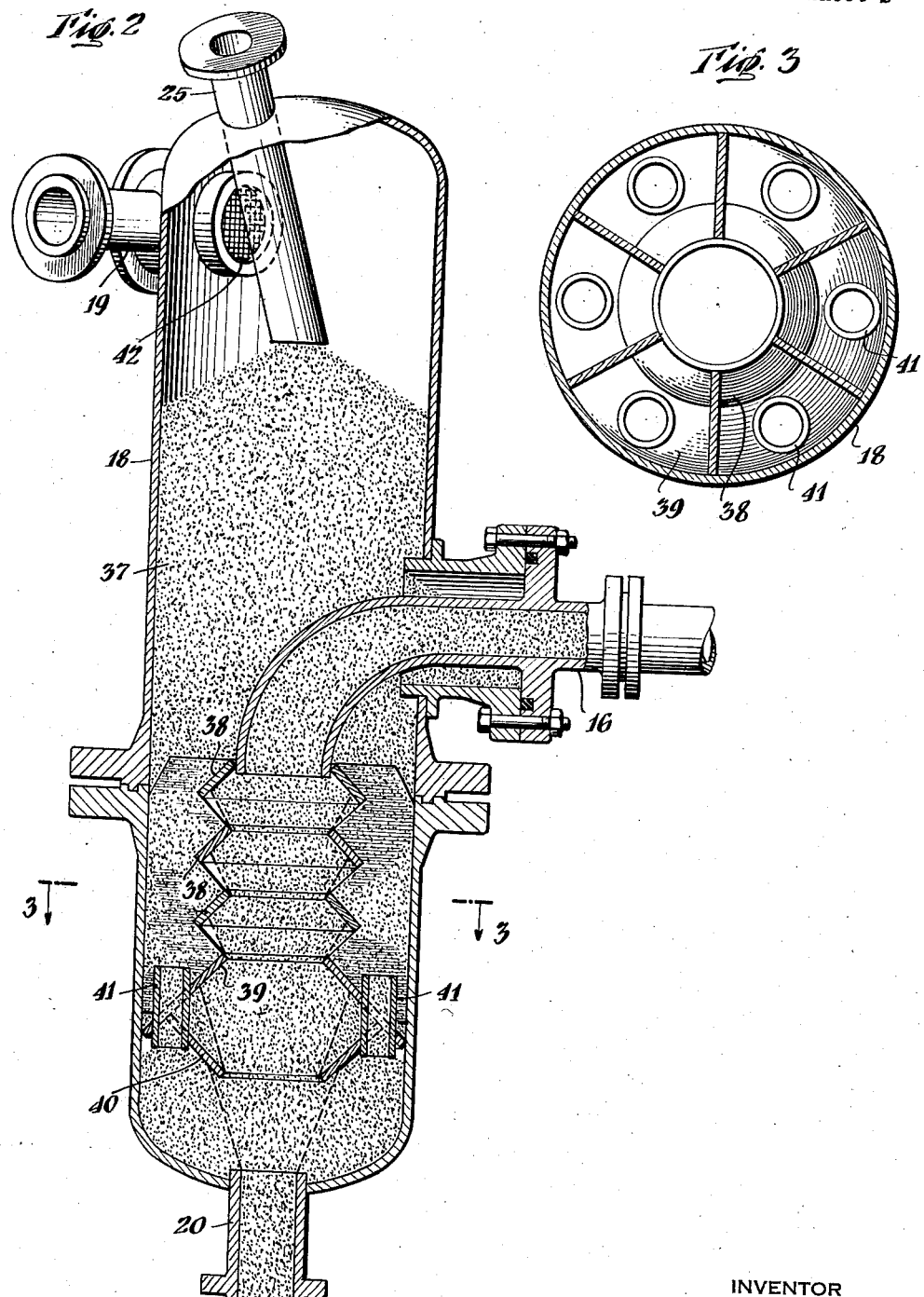
INVENTOR
James H. Haddad
BY
Andrew L. Gaboriault
AGENT

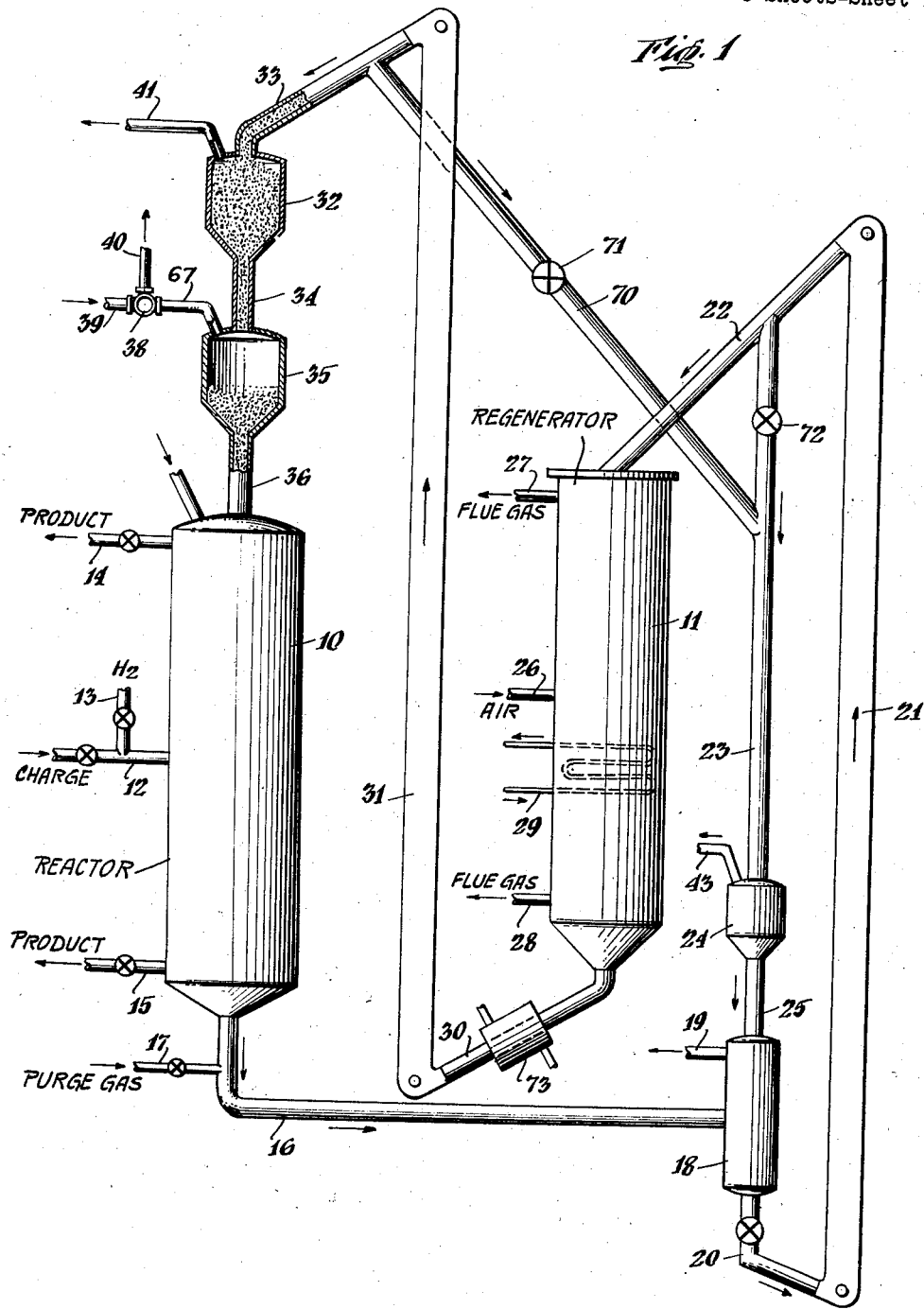

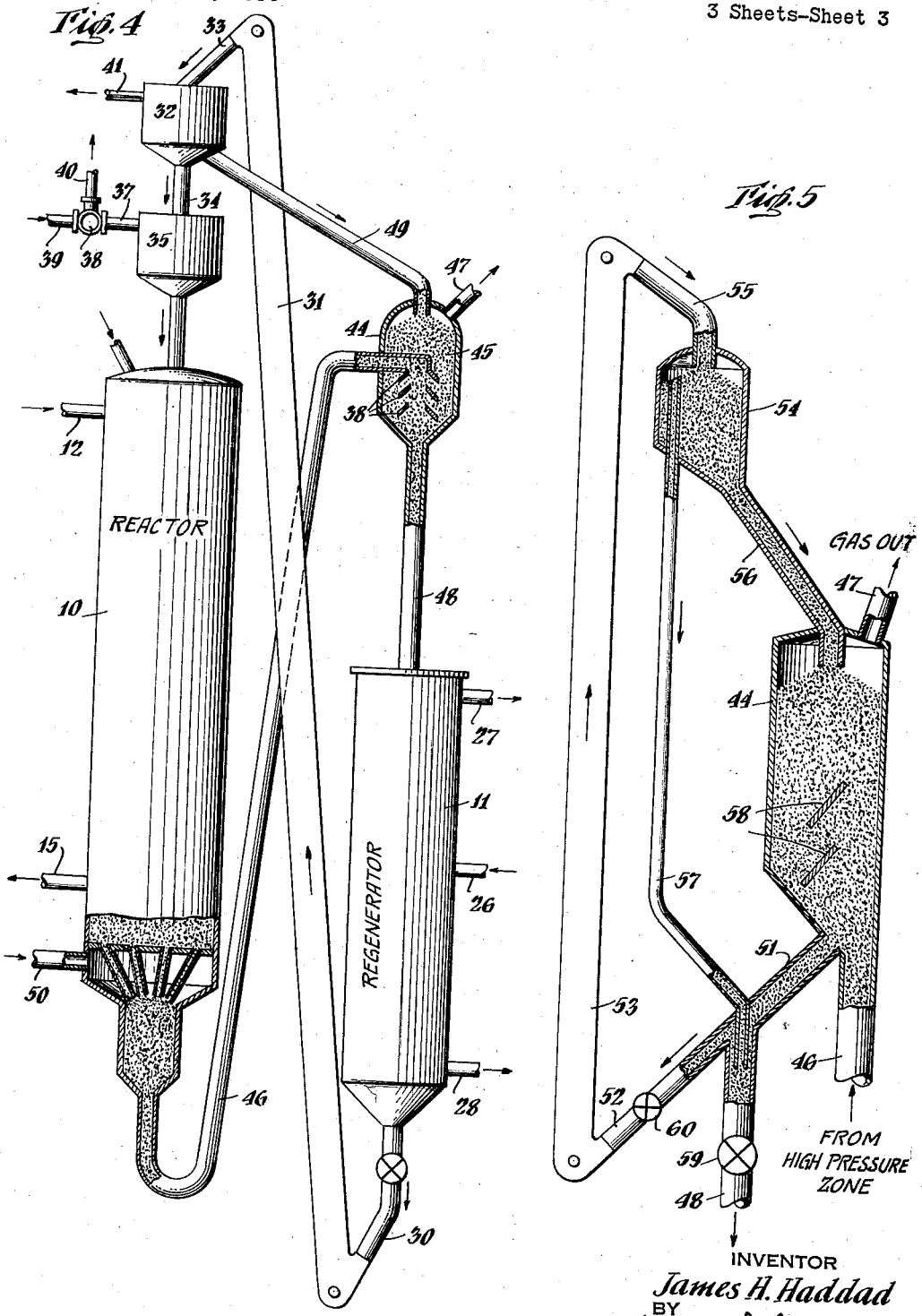

United States Patent Office

2,851,402
Patented Sept. 9, 1958

2,851,402

GRANULAR SOLID TRANSFER METHOD AND APPARATUS

James H. Haddad, New York, N. Y., assignor to Socony Mobil Oil Company, Inc., a corporation of New York Application June 1, 1954, Serial No. 433,548

15 Claims. (Cl. 196—52)

This invention pertains to the transfer of granular solids between two zones, one at a substantially higher pressure than the other. More particularly, this invention deals with the transfer of granular solids from one fluid-solid contacting zone to a second fluid-solid contacting zone at a substantially different pressure, in a manner which will continuously maintain the pressure in each zone.

One typical operation for which this invention is especially suited is the catalytic conversion of fluid reactants, such as hydrocarbons. In such an operation a granular catalyst is continuously cycled between a confined reaction zone and a confined regeneration zone, passing through both zones as a downwardly moving compact column. The catalyst is passed from the lower end of each zone to the upper end of the other. Various typical processes in which this invention will find application include reforming, hydroforming, cracking, isomerization, alkylation, isoforming, aromatization, dehydrogenation, hydrogenation, cyclization, dehydrocyclization, treating, polymerization, coking and visbreaking of hydrocarbons, whether the granular solid used has a catalytic effect on the particular reaction involved or not.

This invention will find application with systems employing solids of palpable particulate form as distinguished from finely divided powders, and the term "granular solids" is used herein to refer to such material. The solids may be of regular shape, such as pellets, tablets, spheres, and the like, or of irregular shape, such as is obtained in grinding and screening operations. Generally, the solids should fall within the size range 1 inch to 100 mesh and preferably 4–15 mesh by Tyler standard screen analysis.

Granular solids suitable for use in catalytic processes include natural or treated clays, bauxite, activated alumina or synthetic associations of silica, alumina, magnesia or combinations thereof, to which certain metallic oxides or sulfides may be added in small amounts for specific purposes. Granular solids which are inert in character include refractory materials, such as zirkite, corhart or mullite, and stones or metallic particles or balls or particles of coke.

In the aforementioned processes, as well as many others to which this invention applies, it is frequently desirable to operate one of the two zones through which the granular solids are cycled at a pressure substantially different from the other zone. For example, in catalytic hydrocarbon reforming and cracking processes, it is usual to operate the reaction zone at a pressure substantially higher than the regeneration zone. These processes, therefore, require some method and apparatus for passing the solids into and out of the high pressure zone which provides for continuous and steady flow of the solids at some desired rate while maintaining the pressure in each of the zones at the level desired. Where the pressure differential between the two zones is low, below about 30 pounds per square inch, the prior art method of feeding is to provide an elongated conduit or gravity feed leg of restricted cross-section. This feed leg is described and claimed in U. S. Patents Nos. 2,410,309 and 2,531,365, and comprises a substantially compact column of granular solids which is in open communication on opposite ends with the low pressure zone and the high pressure zone. The height of a feed leg of prior art design was such that the weight of granular solids per unit area at the bottom of the leg exceeded a certain critical limit, above which smooth flow of granular solids into the high pressure zone was obtained but below which the granular solids would not flow. The weight of the granular solids column per unit area at the base of the column, which is obtained by dividing the weight of the entire vertical length of the column by the area of its base, is conveniently referred to as the calculated head of granular solids in the column. The one difficulty with this system of feeding granular solids was that when the pressure differential between high and lower pressure zones became more than 30 pounds per square inch, the height of the leg became excessive and began to add markedly to the cost of any unit constructed because of the high structure needed. For example, in units for catalytic cracking of hydrocarbons where the difference between reactor and regenerator is 15 pounds per square inch, a feed leg of 60–100 feet is required. Obviously, for systems with higher pressure differences some new system is needed.

A similar problem occurs when the granular solids are removed from the higher pressure to the lower pressure zone. The usual way of accomplishing this removal is through use of an extended leg of compacted granular solids. At the low pressure end, this leg discharges onto a bed of granular solids and the gaseous material passing through the leg from the high pressure zone disengages and is removed. Where the pressure drop per foot of leg is low, below about 1 pound per square inch per foot, very satisfactory operation is achieved. However, where the pressure differential between high and lower pressure zones exceeds about 30 pounds per square inch, a leg which has a pressure drop per foot below the foregoing maximum becomes so excessively long as to add markedly to the height of the contacting unit. If it is decided, regardless of the foregoing maximum, to operate a seal leg of reasonable length with one of the higher pressure differential systems, one will encounter periodic "blow outs." This "blow out" consists of the leg completely emptying itself of granular solids with explosive violence, so that the pressure in the high pressure zone is lost and there is a possible fire hazard if inflammable materials are being used. The "blow out" phenomenon is believed to occur because of a sudden rise in the granular solids level in the bed to which the leg feeds. This results in an instantaneous demand for granular solids in the lower pressure zone beyond the capacity of the leg so that the leg rapidly empties out and the pressures in the two zones become equal.

A major object of this invention is to provide a method and apparatus for transferring granular solids between a high pressure zone and a lower pressure zone which overcomes the above-described difficulties.

Another object of this invention is to provide a method and apparatus for continuously transferring granular solids between a high pressure zone and a lower pressure zone without loss of pressure from the high pressure zone.

Another object of this invention is to provide a method and apparatus for transferring granular solids from a high pressure zone to a bed of granular solids within a lower pressure zone in a manner which avoids disruption of the bed and provides for continuous flow of granular solids while maintaining the desired pressure in each of the two zones.

Another object of this invention is to provide a method and apparatus for transferring granular solids from a point in a high pressure zone to a point in a lower pressure zone substantially above the point in the high pressure zone.

These and other objects of the invention will be apparent from the following detailed description.

Broadly, this invention involves maintaining a seal leg between two zones, one at a high pressure and the other at a substantially lower pressure. The seal leg is of such a length that at the pressure differential between the two zones, fluid material would flow from the high pressure zone through the leg to the lower pressure zone at a rate sufficient to cause boiling of the granular solids at least around the outside edges of the leg in the lower pressure zone. To prevent such boiling, there is maintained above the end of the seal leg in the lower pressure zone a substantially compact bed of granular solids of sufficient horizontal cross-sectional area beginning at least at a level substantially below the upper end of the bed large enough to reduce the velocity of the fluid flowing upwardly therethrough to a velocity below the granular solids boiling velocity. Granular solids are supplied to the upper end of this bed.

This invention will be best understood by referring to the attached drawings, of which:

Figure 1 is an elevational view illustrating one typical process to which this invention may be applied;

Figure 2 is an elevational view, partially in section, illustrating the low pressure end of the transfer apparatus of this invention;

Figure 3 is a sectional view along line 3—3 of Figure 2;

Figure 4 is an elevational view, partially in section, illustrating another form of this invention; and Figure 5 is an elevational view, partially in section, illustrating a third form of this invention.

All of these figures are diagrammatic in form and like parts in all bear like numerals.

Returning now to Figure 1, there is illustrated there, diagrammatically, a continuous catalytic reforming process to which this invention is applicable. The reforming process is chosen merely for purposes of illustration, as this invention has wide applicability to many other kinds of processes as previously noted. Shown in Figure 1 are reactor 10 and regenerator 11, positioned more or less side by side. The granular reforming catalyst, such as synthetic silica-alumina catalyst, upon which has been deposited a small amount of chromium oxide, passes downwardly through the reactor as a substantially compact moving bed. Catalyst might be supplied to the upper end of this bed at temperatures within the range about 700–1050° F. A hydrocarbon charge, which typically would be a hydrocarbon naphtha preheated to a temperature of about 900–1060° F., is admitted centrally to this bed through passage 12. Hydrogen may be added to the charge before it enters the reactor through passage 13. Typically, the mole ratio of hydrogen to naphtha might be 2–5. The charge passes both upwardly and downwardly through the catalyst bed in the reactor and is converted to high octane gasoline. Typical reactor pressure might be 100–300 pounds per square inch absolute. Product is withdrawn from the reactor through passages 14 and 15. The used catalyst, upon which has been deposited a carbonaceous contaminant, is withdrawn from the lower end of the reactor and passed through depressuring leg 16. Near the inlet end of this leg an inert purge gas, such as steam or flue gas, is admitted through conduit 17 and acts to remove any vaporizable hydrocarbon material from the catalyst and to prevent hydrocarbon from escaping from the reactor through passage 16. The catalyst discharges from the depressuring leg into disengaging chamber 18, which is described in more detail hereinbelow. Any gaseous material which is passed through the depressuring leg is removed from the disengaging chamber through passage 19 so that the chamber is maintained at about the pressure of the regenerator. The granular catalyst is removed from the lower end of chamber 18 through passage 20. Passage 20 feeds catalyst into the lower end of a conveyor 21. This conveyor may be any suitable apparatus for transferring hot contact material, such as a bucket elevator or a gas lift. Conveyor 21 elevates the catalyst to a level above regenerator 11. Catalyst passes from the upper end of the conveyor into the regenerator through passage 22. A small portion of the catalyst discharged from the conveyor, however, is returned to the disengaging chamber 18 through passage 23, vessel 24 and passage 25 in a manner described hereinbelow.

Regenerator 11 might typically be operated at atmospheric pressure and the disengaging chamber 18 would, in any case, be maintained at about the same pressure as the regenerator. Catalyst passes through the regenerator as a substantially compact moving bed and an oxygen-containing gas, such as air, is admitted to the central portion of the bed through passage 26. This air passes upwardly and downwardly through the catalyst bed to burn off the carbonaceous contaminants thereon. Flue gas is removed from the regenerator through passages 27 and 28. Cooling coils 29 may be provided to maintain the temperature of catalyst below the heat damaging level. The regenerated catalyst is removed from the lower end of the regeneration zone through passage 30 and passed through a cooler 73 to the lower end of a second conveyor 31. This conveyor elevates the catalyst above a supply hopper 32 and discharges it into the hopper through passage 33. Catalyst then passes into the upper end of the reactor through passage 34, chamber 35 and passage 36, which comprise a system for feeding the catalyst against the high pressure of the reactor, which is described hereinbelow.

Both the system for feeding catalyst to the reactor and the system for removing the catalyst from the reactor, illustrated in the foregoing drawing, are within the broader scope of this invention. It will be advantageous to first consider the system for removal of the catalyst from the reactor in which the granular catalyst is passed from a high pressure to a lower pressure zone, and for this reference should be had to Figures 2 and 3, which illustrate the disengaging vessel 18. The depressuring leg conduit 16 terminates centrally within vessel 18 on a downwardly facing open end. A bed of granular solids 37 is maintained within disengaging zone 18 and depressuring leg 16 terminates substantially below the upper surface of this bed. Depressuring leg 16 is of such a length that the gaseous material which issues from the leg in disengaging zone 18 is at a velocity sufficient to disrupt the bed, so that if the leg were feeding onto an open granular solids surface or bed, boiling of the granular solids would occur at least around the outer edges of the leg. However, that part of bed 37 above the leg prevents such boiling and disruption and thereby prevents the leg blowing out. To achieve this, bed 37 must be of such a cross-section at some level beginning substantially below its upper surface and extending to the top of the bed, that the velocity of the gas which is passing upwardly through the bed is reduced below the level which will disrupt the bed. The gas is removed from the disengaging zone through passage 19 while the granular solids are removed therefrom through passage 20. Granular solids are continuously fed onto the surface of bed 37 through passage 25, which connects to chamber 24 and passage 23, shown in Figure 1. The granular solids so supplied to the bed may be either freshly regenerated solids or spent solids. Returning momentarily to Figure 1, if spent solids are desired, valve 72 in line 23 is kept open while valve 71 in line 70 is closed. If fresh solids are desired, valve 71 is opened while valve 72 is closed. The use of fresh solids has an advantage particularly in systems which employ a heavy feed stock, such as catalytic cracking. In such systems heavy hydrocarbons may be associated with the catalyst, either in the voids between particles or in its pores, in a manner such that they are not purged out in the reactor. When the catalyst enters the lower pressure disengaging zone, the hydrocarbon material separates and passes out into the atmosphere, a situation which it is desirable to prevent. It is explained in U. S. Patent No. 2,743,295 that such hydrocarbon material or "plume" may be adsorbed on cool, fresh adsorbent catalyst. Thus, by use of cool, fresh catalyst in the upper part of bed 37, it is possible to adsorb any hydrocarbon material which may be released in the disengaging zone. This material would then be carried into the regenerator for burning. To effect adsorption of the hydrocarbon material, the catalyst stream supplied to the upper end of bed should be cooled to a temperature below 600° F. and preferably below 250° F. This may be accomplished in the reforming process of Figure 1, where catalyst circulation rates will be low, by cooling all the catalyst from the regenerator to the desired temperature by means of cooler 73 and then relying on the charge to the reactor to supply the heat required by the conversion therein. Alternatively, only the catalyst which passes to the disengager through passage 70 could be cooled.

The continuous supply of granular solids to bed 37 insures that that bed will always be at a level sufficient to prevent disruption of the bed. There will be no variation in the level of bed 37, but it will remain adjacent the lower end of passage 25. In order to insure that a major portion of the granular solids which are removed from the disengaging chamber through passage 20 are solids which flow out of passage 16 rather than those which come from passage 25, various flow control baffles 38, 39 and 40 are provided between the outlet end of passage 16 and the inlet end of passage 20. These baffles are in the shape of frusto-conical hoops and are so shaped that conduit 20 draws granular solids primarily from the area centrally within the baffles. This is achieved providing that a line drawn outwardly at an angle of about 75 degrees from the inside edge of each baffle strikes the next baffle above at about its center. The angle of internal flow of granular solids is about 75 degrees, so such an arrangement insures that granular solids from passage 16 will pass preferentially into passage 20. Baffle 39 extends outwardly to the walls of vessel 18, while baffles 38 terminate well short of these walls. A plurality of passages 41 extend through baffle 39 and insure that there will be some movement of granular solids downwardly in that portion of the bed above the lower end of passage 16. This is desirable in order to prevent concentration of fine material in this portion of the bed. The movement in this part of the bed, however, will be minor compared to that which occurs in the area centrally within baffles 38, 39 and 40.

The advantages of this depressuring system over those of the prior art are readily apparent. Depressuring leg 16 may be of almost any length desired, that is, it may be as short as desired. All that is then required is that bed 37 be of sufficient cross-section beginning at some level substantially below its upper end to reduce the gaseous velocity below that which would disrupt the bed. Thus, if leg 16 is shortened, all that is necessary to provide a system which will operate continuously and satisfactorily, is to provide for an increased cross-section and/or height of vessel 18, since the result would be an increase in velocity of the gas issuing from the leg within vessel 18. The gas, as it issues, occupies a very small area around the lower end of the leg and then as it passes upwardly through bed 37, it expands outwardly to attain a uniform velocity across the entire cross-section of vessel 18. If vessel 18 is cylindrical in shape, this velocity must then be below the bed disruption velocity. Alternatively, the vessel 18 could taper outwardly from the lower end of the seal leg, so that the velocity across the bed therein might still be above boiling when it became uniform across the bed but would drop below boiling with expansion of the bed.

A further system within the broader scope of this invention is the method employed to feed the catalyst to reactor 10 of Figure 1. This method is described and claimed in detail in U. S. patent application, Serial No. 327,561, filed November 6, 1953, now abandoned. Surge hopper 32 connects to a pressuring vessel 35 by means of a short vertical conduit 34. Pressuring vessel 35 connects to the upper end of the reactor 10 to a similar short conduit 36. Extending into the upper section of chamber 35 is a gas conduit 67 with a three-way valve 38 thereon, so that conduit 67 may be either connected to a source of pressure through conduit 39 or to the atmosphere through conduit 40. Extending from the upper end of supply hopper 32 is a gas outlet conduit 41.

In operation, the pressure in surge hopper 32 is maintained low, at about the pressure of the regenerator by gas removal through passage 41, and catalyst is added continuously to this hopper through conduit 33. A cycle may be considered to start when hopper 35 is filled with catalyst. Valve 38 is operated to connect passages 39 and 67 and increase the pressure within hopper 35 to a level near that within the upper end of reactor 10 such that granular catalyst will flow from hopper 35 into the reactor. While this is occurring, flow from hopper 32 to 35 through passage 34 has been stopped by the upflow of gas through the passage 34. This occurs because leg 34 is so short that the gas from hopper 35 flows upwardly at a velocity above the boiling velocity, so that if the pressure drop between the pressured vessel 35 and hopper 32 were taken across the leg in the normal fashion, the leg would blow out. However, the height and cross-section of the bed within hopper 32 is made such that the gas, after it exits from leg 34, is reduced in velocity to a velocity below that which would disrupt the bed at some level substantially below the upper surface of the bed. The bed and leg are thereby maintained in a compacted condition. Gas which flows through the bed exits from its upper end and from hopper 32 through passage 41. When the level of catalyst within vessel 35 reaches a low level, valve 38 is operated to connect passage 67 with passage 40, and the pressure within passage 35 is reduced to a level near that in vessel 32. When this occurs, catalyst feeds from hopper 32 into vessel 35. Leg 36 then operates in a manner similar to that of leg 34 in the previous stage of the operation. Flow is stopped through the leg by the upflow of gas at a velocity above the boiling velocity and issues from the upper end of the leg above that velocity. However, the bed within vessel 35 is at all times, even when it is at minimum height, maintained of sufficient height and cross-section to reduce the velocity of the gas from the reactor to a level below the bed disrupting or boiling velocity at some level substantially below the upper end of the bed. When hopper 35 is filled, the pressure within the hopper is again increased and flow through passage 34 ceases while flow through 35 resumes. It is important in all the various forms of this invention that the catalyst within the seal leg and the bed above the low pressure end of the seal leg be maintained in a compacted condition. This means that the catalyst particles should rest upon each other, each particle continuously touching all those contiguous to it. This condition is to be distinguished from a boiling or fluidized condition in which the particles move about in random motion. The fact that compacted condition is required does not mean that the ultimate in compactness is needed. Thus, if the granular material is poured into a container, this is considered to form a compacted accumulation, even though agitation of the container may cause considerably additional compacting.

A device similar to that just described may be used in conjunction with the depressuring system as a safety feature to prevent the reactor 10 from being emptied of catalyst should seal leg 16 fail. Considering Figures 1 and 2 together, gas outlet 19 is equipped with a screen or other foraminous partition 42. This screen or partition should have openings of such a size that it is pervious to gas flow but impervious to the granular solids being used in the system. Situated at the upper end of gas conduit 25 is a surge or supply hopper 24 with gas outlet 43, in which there is maintained a bed of granular solids supplied by conduit 23. Should some accident occur which would empty seal leg 16, so that the disengager 18 would rise to a pressure equal to that within reactor 10, the reactor can not empty itself of catalyst through passage 25, since the bed within supply hopper 24 is made of sufficient height and cross-section that when the gas flow is that obtained at a pressure differential equal to that between the reactor and hopper 24, the gas velocity is reduced below the bed disruption velocity at some level substantially below the upper surface of the bed within hopper 24, even though gas may issue from the upper end of passage 25 at a velocity which would normally disrupt the bed. Consequently, solids from the reactor will not flow up through passage 25, and all that might happen is that the upper end of disengager 18 would fill with granular solids. The reactor, however, would not empty itself.

Another form which this invention may take is illustrated in Figure 4. Shown there are high pressure reactor 10 and lower pressure regenerator 11, similar to those of Figure 1. In this case, a disengaging zone 44 is situated above the regenerator 11 and contains a substantially compact bed of contact material 45. A combination lift pipe and depressuring leg 46 extends upwardly from the lower section of the reactor to a point beneath the surface of bed 45. The length of this pipe is such that the calculated head of the column of catalyst which it contains is less than the pressure differential between the reactor 10 and disengager 44, which is maintained about the pressure in regenerator 11. The terms "calculated head of granular solids," "vertical head of granular solids" and similar terms are used herein to mean the head of granular solids obtained by dividing the total weight of granular solids in the vertical part of the column above its lower end by the cross-sectional area of the column. Thus, gaseous material flows through pipe 46 at a velocity sufficient to blow out the catalyst in the pipe and sufficient to disrupt bed 45 at least around the outlet edges of pipe 46. Such disruption is prevented by maintaining above the lower end of pipe 46 sufficient height and cross-section of bed 45 to reduce the gas velocity below the bed disruption velocity substantially below the upper surface of bed 45 and maintain the gas velocity below the disruption velocity until it issues from the bed. Gaseous material is withdrawn through passage 47. Baffles 38 are provided in the lower portion of the bed below the outlet end of 46 to provide for preferential withdrawal of granular material through passage 48 from 46, rather than from the upper end of bed 45. Passage 48 discharges contact material into regenerator 11. Disengager 44 is situated below surge hopper 32, which is at a pressure about equal to that in the upper end of the regenerator, so that granular solids may flow by gravity through passage 49 onto the upper surface of bed 45. Accordingly, the granular solids can be moved continuously up through passage 46 in compacted condition, at the same time being lifted and depressured. In order that hydrocarbon reactants are not passed through passage 46 and lost through passage 47, a suitable inert seal gas, at a pressure slightly greater than the reactor pressure, is supplied to the lower section of the reactor vessel through passage 50. This seal gas is the gaseous material which passes up through 46.

In order to use the system of Figure 4, it is necessary that reactor and regenerator be situated relatively side by side, so that granular solids will flow from hopper 32 into disengager 44. However, in many situations, it may be desirable to place regenerator 11 over reactor 10. This could avoid the use of a long elevator 31. A part of such a system is shown in Figure 5. There, a combination lift pipe and depressuring passage 46 connects into the lower end of disengager 44. The pressure drop across the lift pipe is greater than the calculated head of granular solids in the pipe, so that gaseous material issues from the upper end of 46 at a velocity sufficient to disrupt the compact bed maintained within disengager 44. This bed, however, is maintained of sufficient height and cross-section that the gas velocity is reduced below the bed disruption velocity at a level substantially below the upper end of the bed, so that the material in passage 46 and in disengager 44 remain in compacted condition. Gas is removed through passage 47 at a level above the compact bed in sufficient quantity to maintain the pressure in the disengager about equal to the low pressure of the regenerator. A compact stream of contact material is withdrawn from disengager 44 through passage 51. This stream is split into two components, one passing through passage 48 to the regenerator, the other passing through passage 52 to the lower end of a short conveyor 53. Conveyor 53, which may take the form of a bucket elevator, gas lift, or the like, elevates the granular solids and discharges them into a surge hopper 54 through passage 55, which surge hopper is situated at a level above the upper end of disengager 44. Passage 56 extends from the lower end of surge zone 54 into the upper end of disengager 44 and terminates therein at a position suitable to supply granular solids as a compact stream to the upper end of the bed therein. An overflow conduit 57 extends from a point below the surface of the compact bed of granular material in surge zone 54 to a position within passage 48 suitable to discharge solids therein. Baffles 58 are provided within disengager 44 so situated as to cause passage 51 to draw solids preferentially from the lower part of the bed in disengager 44, which lower part is supplied mainly from leg 46, rather than from the upper section of the bed supplied through passage 56. All flow through the upper section of the bed is not cut off by these baffles, however.

In operation, the granular solids are maintained within the lift 46 and the beds in vessels 54 and 44 in compacted condition. Valve 59 or other flow throttling device in line 48 is set to deliver granular solids at the process flow rate to the next step of the process. Valve 60 in line 52 is set to deliver to conveyor 53 an amount of granular solids in excess of the amount drawn from the portion of the bed supplied by passage 56. A surge bed is maintained within hopper 54 to insure that there will always be sufficient granular solids to supply the bed in the disengager and avoid a drop in that bed level. The inlet end of overflow pipe 57 is situated beneath the upper surface of the bed in hopper 54 when the hopper is full. This insures that in normal operation solids will be constantly flowing through 57, which will be full of solids. Should the bed level in 54 drop, passage 57 would begin to empty. This occurrence could be determined visually or by means of one of the numerous conventional bed level measuring devices. When this happened, valve 60 could be adjusted to bring the bed level in hopper 54 up. Alternatively, a level control device could be used in hopper 54, from which valve 60 could be operated to insure sufficient supply of granular solids for the disengaging bed in vessel 44.

It will be apparent that all of the various forms of this invention illustrated in the attached drawings operate in broadly the same manner. A seal leg of compacted granular solids or contact material extends from a high pressure zone to a substantially lower pressure zone. The seal leg terminates in the lower pressure zone beneath the surface of a compacted bed of granular solids. A fluid material passes through the seal leg from the high pressure zone to the lower pressure zone and discharges from the seal leg at a velocity sufficient to disrupt the bed at that point. The disruption is, however, prevented by maintaining sufficient height and cross-section of the bed above the seal leg end to reduce the fluid velocity below the bed disruption velocity or boiling velocity at a level substantially below the upper end of the bed. The bed is supplied with solids on its upper surface and gas is removed from the lower pressure zone at a level above the bed.

The bed and vessel which confines it may take any desired shape consistent with the foregoing requirements. Thus, the bed may be of constant cross-section, which cross-section is sufficient to reduce the gas velocity below the boiling velocity when the gas issuing from the seal leg is distributed uniformly across the bed. Or, if desired, the bed and confining vessel may taper outwardly from the low pressure end of the seal leg to the required cross-section.

For any given bed, the level at which the gas velocity is just at the boiling velocity will vary directly with the quantity of gas issuing from the seal leg. Were the bed to end at this level, the leg would probably blow out because of the upward push of the solids below. While most of the solids push is absorbed by the walls of the seal leg and the vessel which confines the bed, the push of solids in the region just below the level at which the fluid is just at the disruption or boiling velocity is not so absorbed. Consequently, above this level, which is termed herein "the critical level," to avoid loss of the seal leg, there need be a small height of granular solids. But since most of the upward force is absorbed by the wall of the vessel and seal leg pipe, this height need not be large.

In addition, the part of the bed above this critical level must be of sufficient cross-section that the gas velocity drops below the boiling velocity in this part of the bed. This latter requirement is obvious from the foregoing explanation since, even though the fluid velocity may be reduced to the boiling velocity well below the upper surface, if it remains at this velocity and issues from the upper surface of the bed at this velocity, there will still be a "blow out" of the seal leg because the upward push of the solids will exist at the upper surface of the bed without any height of bed to counteract it. The minimum required bed height above the critical level will depend on the relative cross-section of the bed above and below the critical level and on the density of the granular solids. Also, this minimum bed height increases substantially in direct proportion to the total pressure drop across the seal leg and bed. The amount of bed height above the critical level has been found to vary somewhat with granular solids particle size, a smaller bed height being required with increasing particle diameter. The minimum height is also influenced by the hydraulic radius of the seal leg and of the disengaging vessel at level both above and below the critical level in the bed with other factors, such as the ratio of seal leg to disengaging vessel diameters, being constant. In general, a decrease in hydraulic radius in the seal leg by use of vertical partitions therein or a decrease in hydraulic radius in the disengaging vessel by using a grating or baffles as described in U. S. patent application, Serial No. 344,576, filed March 25, 1953, greatly reduces the minimum bed height required above the critical level. In any case, the minimum bed height above the critical level should be greater than 2 inches and usually should be greater than 6 inches. As an example of what is meant by a fluid velocity below that which would boil the granular solids, such a velocity would be one which will give rise to a pressure drop per foot ½ an inch of water less than does the boiling velocity.

The ratio of the diameter of the disengaging vessel to the diameter of the seal leg conduit should be within the range about 3–10 where the pressure differential across the seal leg is within the range about 1–15 per square inch per foot. Where the pressure drop is of the order of about 1¾ pounds per square inch per foot of seal leg, this aforementioned ratio should preferably be within the range about 4–6. With higher pressure drops, for example, of the order of 2½ pounds per square inch per foot and broadly within the range about 2½–5 pounds per square inch per foot, the ratio of diameters should be not less than 6.

It is also generally desirable to maintain the hydraulic radius in the bed less than 2 inches and preferably less than 1 inch. Hydraulic radius is used here in the conventional manner, as the quotient of the area of a particular passage or vessel which contains granular solids divided by the perimeter of the vessel or passage which the solids touch. Thus, using a grating or partitions in a passage or vessel decreases the hydraulic radius because it increases the perimeter touched by granular solids without substantial increase in the area.

When the seal leg is also used to elevate the granular solids, as shown in Figure 4, the leg must be of such a length that the pressure drop per foot exceeds the calculated head of granular solids, that is, greater than the quotient of the vertical height of granular solids in the leg divided by the cross-sectional area of the leg. When the pressure drop per foot exceeds this value, the solids will begin to move upwardly. Hence, for a material of 40 pounds per cubic foot compact flowing stream density, the pressure drop per foot of vertical column height must exceed $$\frac{40 \times 1}{144} = .277 \text{ pound per square inch}$$

to move the solids. It should be understood that there is actually no hydrostatic head at the lower end of a compact stream of granular solids of the type created by a vertical stand pipe of powdered solids but that the foregoing calculation is only a convenient method of estimating pressure drop requirements.

Differences between the lifting method which forms a part of this invention and those of the prior art should be noted. Lifting granular material in compacted condition is not claimed to be novel here, as this may be found in U. S. patent application, Serial No. 289,647, filed May 23, 1953. However, it was found necessary in that case to use a mechanical throttle to maintain the lift leg in compacted condition. Such a throttle, which may be a fertile source of undesirable solids attrition, is not required here since the bed above the low pressure end of the lift leg serves this function. The use of such a bed at the upper end of the lift is described in U. S. patent application, Serial No. 283,453, filed April 21, 1952, now U. S. Patent No. 2,769,672. However, in that case the granular solids, as they issued from the lift, served as the sole supply of solids to the bed. In this invention solids are also fed separately on top of the bed so that should there be a sudden pressure surge across the lift leg, sufficient height may still be maintained in the bed to prevent boiling. When the solids supplied to the bed all come from the seal leg, the bed will only rise to a height which just prevents disruption of the bed. Should a sudden pressure surge then occur, the gas velocity at the upper surface might exceed the boiling velocity. This would cause a sudden demand for granular solids to increase the bed height. The seal leg might not be able to fulfill such a demand and might empty with a resultant "blow out" and increase of pressure in the disengager. By supplying solids to the top of the bed, sufficient height of bed can be provided to absorb any sudden fluctuation in pressure differential across the leg.

When the seal leg in this invention extends downwardly from the high pressure zone at an angle of inclination greater than the angle of repose of the granular solids and solids are continuously flowing therethrough, no particular pressure drop across the leg is needed to force the solids through the leg as they will flow by gravity. The angle of repose is usually between 25 and 45 degrees with the horizontal, and for most granular solids is about 30 degrees. When the seal leg is inclined less than the angle of repose, in order to force the solids through the leg in compacted condition, a pressure drop per foot is needed above that determined as follows:

$$\frac{\Delta P}{L} = \frac{\rho c}{144}$$

where $\frac{\Delta P}{L}$ = the pressure gradient in pounds per square inch per foot $\rho c$ = the loose packed density of the granular solids in pounds per cubic foot. The maximum flow capacity of a given seal leg inclined at an angle with the horizontal less than the angle of repose can be increased by increasing the pressure gradient in the direction of flow above the minimum specified above.

A depressuring leg inclined at an angle less than the angle of repose is the subject of claims in U. S. patent application, Serial No. 519,216, filed June 30, 1955, and such a leg may be advantageously used in this invention as it provides for a fluid-solids contacting unit of minimum height.

As stated in the aforementioned application, the depressuring leg should be designed so that the granular solids velocity is within the range 0.5 to 5, while the average pressure drop per foot of leg should be within the range 1 to 25 pounds per square inch per foot. The use of these limits serves to insure that minimum solids attrition occurs in the leg and that the consumption of seal gas through the depressuring system is not excessive.

While seal leg and disengaging chamber have been shown, and are preferably constructed, so as to be circular in cross-section, other shapes, such as rectangular, hexagonal, etc., may be used if desired.

Also, the seal leg may be advantageously tapered, as shown in U. S. patent application, Serial No. 329,882, filed January 6, 1952.

While it has been indicated in the foregoing description that some flow of solids should occur in all parts of the bed above the discharge end of the seal leg to avoid accumulation of fines therein, within the broader scope of this invention the bed may be baffled so that its upper portion remains substantially stagnant.

Also, while the description has been concerned with the flow of gaseous material through the seal leg, within the broader scope of this invention liquid may be the material which passes between high and low pressure zones rather than gaseous material.

This invention will find application broadly in any system when the seal leg is such that gas issues therefrom above the boiling velocity. Of course, this will depend, for a given flow rate, on the size of the granular solids being used, since a greater pressure drop will occur across any leg of fixed length the smaller the particles in the leg.

Generally, for the size particles used in commercial Thermofor catalytic cracking process and the Thermofor catalytic reforming process, the average pressure drop per foot must exceed about 0.3 pound per square inch per foot before the gas will issue from the leg above the boiling velocity. These particles generally average about 4 to 15 mesh Tyler, and the boiling velocity might be about 5 feet per second.

In prior art seal legs, such as those used in the T. C. C. process, the pressure drop across the leg was usually about 0.4 to 0.9 pound per square inch per foot and so the gas issued from the leg above the boiling velocity. Frequently there would be boiling of the bed beneath the leg and this invention will find application in preventing such boiling. However, the boiling that occurs with legs of such low pressure drops, is not a severe problem, since "blow outs" rarely occur. In any case, when the pressure gradient across the leg exceeds 1 pound per square inch, "blow out" is very likely to occur and reoccur with some frequency. It is with such seal legs that this invention finds particular application.

If desired, in this invention more than one seal leg with separate confining beds or the same confining bed may be used.

For a moving bed Thermofor catalytic reforming process with which this invention might find application, the conditions within the reactor should be as follows:

|  | Broad | Preferred |
| --- | --- | --- |
| Vapor Inlet T, ° F | 100–1,100 | 900–1,060 |
| Cat. Inlet T, ° F | 100–1,200 | 700–1,050 |
| Space Vel | 0.1–6.0 | 0.5–2.5 |
| Recycle Ratio: |  |  |
|   Mols H₂/mol Reactant | 1–8 | 2–5 |
|   Mols recycle/mols Reactant | 1–15 | 4–10 |
| Pressure, p. s. i. a | 15–600 | 100–300 |
| Kiln T, ° F | 600–1,400 | 700–1,100 |
| Kiln P, p. s. i. a | 15–600 | 15–35 |

Other typical processes in which this invention may be used are readily apparent. Thus, it may be used to feed solids to or from a high pressure hydrocarbon cracking reactor or to or from a high pressure kiln, or to feed liquids to or from pressurized liquid-solids contactors.

*Example I*

A tapered depressuring leg with a small diameter of about 3 inches connecting to a pressure vessel and a large end of about 6 inches in diameter was used. The larger end of the leg was pointed downwardly and terminated in an open-topped disengaging vessel which was 2 feet in diameter and 7 feet high. The depressuring leg was about 20 feet long. A series of 3 frusto-conical shaped baffles were attached to the lower end of the leg, the upper baffle being attached directly to the leg while the others were spaced at 3-inch intervals below, similar to the Figure 2 design. This system was operated with the pressure vessel at pressures as high as 175 p. s. i. g. or 8.75 p. s. i. per foot of leg with synthetic bead catalyst. Catalyst was added to the disengaging vessel sufficient to maintain a 3 foot height of catalyst bed above the lower end of the leg. Catalyst rates of 19 tons per hour were used. No "blow out" occurred with this system, although "blow outs" had been frequent with prior systems in which the bed above the leg was not used.

*Example II*

A 2 inch diameter depressuring leg, 14 feet long, was situated so that substantially the entire leg lay in a horizontal plane. The discharge end of the leg turned downwardly and a frustum of about 15 inches diameter was attached to this end. The discharge end was situated in an open-topped vessel 22 inches in diameter. A catalyst level of about 1 inch was maintained above the lower end of the frustum. This leg operated successfully at a pressure drop of 1 pound per square inch per foot.

*Example III*

An 8 inch diameter seal leg, 10 feet long, was connected at its upper end to the bottom of an open-topped hopper in the shape of an inverted cone having a diameter at the conical apex equal to 8 inches and a diameter 41½ inches above its lower end of 51 inches. The lower end of the seal leg was connected to a closed vessel which was pressured with air to obtain the point where the "blow out" of the leg occurred for varying heights of bed above the seal leg. The following results were obtained:

| Maximum Pressure Differential at Blow Out, p. s. i. | Total Bed Height Above End of Seal Leg, Inches | Height of Bed Above Critical Level, Inches |
| --- | --- | --- |
| 10 | 12 | 7.0 |
| 20 | 24 | 14.5 |
| 29 | 36 | 24.0 |

Example IV

A device constructed so as to elevate catalyst while depressuring it consisted of a 20 foot high lift pipe 4 inches in diameter. It is possible to obtain the following catalyst velocities through such an apparatus:

| Average Pressure Gradient, p. s. i./foot | Catalyst Velocity, feet/second |
|---|---|
| 1.2 | |
| 1.3 | 1 |
| 1.4 | 2 |
| | 3 |

It is possible to prevent "blow out" of such a leg by using a bed of 1 foot depth above the upper end of the lift pipe in a disengager of 23 inches in diameter.

It should be understood that it is intended to cover herein all changes and modifications of the examples of the invention chosen for purposes of disclosure which do not constitute departures from the spirit and scope of the invention.

I claim:

1. A method for transferring granular solids between two zones maintained at substantially different pressures, which comprises: maintaining a seal leg of granular solids in a compacted condition between the two zones, the seal leg being of such a length that at the pressure differential between the two zones fluid material would flow from the high pressure zone to the lower pressure zone at a rate sufficient to cause boiling of the granular solids at least around the outside edges of the leg in the lower pressure zone, maintaining above the end of the seal leg in the lower pressure zone a substantially compact bed of granular solids of greater horizontal cross-section than the seal leg, said bed being of horizontal cross-sectional area beginning at least at a level substantially below the upper end of the bed which is large enough to reduce the velocity of fluid material flowing upwardly therethrough to a velocity below the boiling velocity, and supplying granular solids to the upper surface of the bed within the low pressure zone.

2. A method for the transfer of granular solids between two confined zones at substantially different pressures, which comprises: maintaining a substantially compact bed of granular solids within the lower pressure zone, maintaining a confined compact seal leg of granular solids of substantially less cross-section than said two zones extending between said zones and opening into the lower pressure zone at a location beneath the granular solids bed, the length of said leg being such that gaseous material flowing from the high pressure zone through the leg issues from the leg in the low pressure zone at a velocity which would be sufficient to boil the granular solids at least around the edges of the leg in the lower pressure zone, maintaining the area of the bed at a level beginning at least substantially below its surface of sufficient horizontal cross-section to reduce the gas velocity below the boiling velocity, supplying granular solids to the upper surface of the bed, maintaining the horizontal cross-section and depth of the bed such that the gas issuing from said seal leg is reduced in velocity to a velocity below that which would disrupt the compactness of said bed at a level substantially below the upper surface of said bed, and continuously removing granular solids from the lower pressure zone so that there is continuous movement of the granular solids through the seal leg.

3. A method for transferring granular solids from a high pressure zone to a lower pressure zone, which comprises: maintaining a substantially compact bed of granular solids within the lower pressure zone, passing granular solids as a substantially compact column of substantially less horizontal cross-section than either of said zones from the high pressure zone into the lower pressure zone at a location substantially below the upper surface of said bed, the length of said column being such that gaseous material flows from said high pressure zone into the lower pressure zone and discharges from said column in the lower pressure zone at a velocity which would be sufficient to disrupt the bed at least around the edges of the column, preventing such disruption by maintaining sufficient height and horizontal cross-section of said bed above the low pressure end of said column to cause the gaseous material to decelerate as it passes upwardly through the bed and be reduced in velocity below the velocity which would disrupt the bed at a level substantially below the upper surface of the bed, and continuously removing granular solids from the lower end of said bed and continuously supplying granular solids to the upper surface of said bed.

4. A method for continuously transferring granular solids from a high pressure zone to a lower pressure zone maintained at a level below the high pressure zone, which comprises: passing a confined column of granular solids having a horizontal cross-section less than either of said zones downwardly from said high pressure zone into said lower pressure zone, discharging granular solids from said column beneath the surface of a substantially compact bed of granular solids maintained within the lower pressure zone, maintaining the length of said column such that gaseous material flows through the column and issues therefrom at a velocity which would be sufficient to disrupt the bed at least around the edges of the column if said column discharged onto the surface of a granular solids bed, preventing such disruption by maintaining sufficient height in horizontal cross-section of said bed above the lower pressure end of said column to cause the gaseous material to decelerate as it passes upwardly through the bed and be reduced in velocity below the velocity which would disrupt the bed at a level substantially below the upper surface of the bed, continuously removing granular solids from the lower end of the bed, and continuously supplying granular solids to the upper surface of the bed from a source other than said column.

5. A method for continuously transferring granular solids from a high pressure contacting zone to a relatively lower pressure contacting zone, which comprises: passing granular solids from the high pressure zone to a disengaging zone as an elongated substantially compact confined stream of restricted cross-section compared to the high pressure zone and the pressuring zone, maintaining the length of said stream sufficiently low to cause gaseous material to pass through said stream and issue from the lower end thereof in the disengaging zone at a velocity sufficient to cause disruption of a granular solids accumulation maintained with upper surface at the level of the lower end of said stream, maintaining above the lower end of said stream a substantially compact bed of granular solids of sufficient length and cross-section to cause the velocity of the fluid issued from said stream to be reduced below the disruption velocity at a level substantially below the upper surface of said bed, supplying the upper surface of said bed with granular solids, maintaining the pressure in the disengaging zone at a pressure near that in the lower pressure zone, withdrawing solids from the depressuring zone at a level below the lower end of said stream, and passing the solids so withdrawn into the lower pressure zone.

6. A method for transferring granular solids between a high pressure zone and a lower pressure zone maintained at a level substantially above the high pressure zone, which comprises: maintaining a seal leg of granular solids in compacted condition with lower end in said high pressure zone and upper end in said low pressure zone, said seal leg being of restricted cross-section compared to said zones and said seal leg being of such a length that at the pressure differential between the two zones fluid material would flow from the high pressure zone to the lower pressure zone at a rate sufficient to cause boiling of the granular solids at least around the outer edges of the seal leg in the lower pressure zone, maintaining above the low pressure end of the seal leg a substantially compact bed of granular solids of greater horizontal cross-section than the seal leg and being of sufficiently large horizontal cross-sectional area beginning at least at a level substantially below the upper end of the bed to reduce the velocity of the fluid material flowing upwardly therethrough to a velocity below the boiling velocity, removing fluid material from said low pressure zone at a level above the bed, and supplying granular solids to the upper surface of the bed.

7. A method for the continuous transfer of granular solids from a high pressure zone to a low pressure zone maintained at a level substantially above the high pressure zone, which comprises: passing a continuously moving, substantially compact column of granular solids upwardly from the high pressure zone into the low pressure zone, said column being of restricted cross-section compared to both of said zones and said column being of such a length that gaseous material flowing through the column from the high pressure zone to the low pressure zone issues from the column at a velocity sufficient to boil granular solids at least around the edges of the column, maintaining within said lower pressure zone a substantially compact bed of granular solids and discharging said column beneath the surface of the bed, preventing boiling of the granular solids by maintaining the height and horizontal cross-section of said bed such that the velocity of gaseous material flowing upwardly through the bed is reduced below the velocity which will disrupt the bed at a level substantially below the upper surface of the bed, removing gaseous material from the low pressure zone at a level above the bed, continuously supplying granular solids to the upper surface of the bed through a stream separate from said column, and continuously removing granular solids from said lower pressure zone at a point below the low pressure end of said column.

8. In a continuous gas-solid contacting process wherein granular solids are continuously cycled between a high pressure zone and a lower pressure zone maintained side by side with a confined granular solids surge space maintained at a level above both of the zones and granular solids are transported upwardly from the lower end of the lower pressure zone to the surge zone and then downwardly from the surge zone into the upper end of the high pressure zone, the improved method of transferring the granular solids from the lower end of the high pressure zone to the upper end of the lower pressure zone, which comprises: maintaining a substantially compact bed of granular solids within a confined disengaging zone maintained at a level above the low pressure zone and below the surge zone at a pressure near that in the low pressure zone, passing granular solids continuously as a substantially compact column upwardly from the lower end of the high pressure zone into the disengaging zone and discharging the solids from said column into the disengaging zone at a level below the surface of the bed, the column of granular solids being of such a length that gaseous material flows upwardly through the column and issues from the column at a velocity sufficient to disrupt the bed of granular solids at least around the outer edges the bed of granular solids at least around the outer edges of the column discharge end, preventing such disruption of the column discharge end, preventing such disruption by maintaining the bed of sufficient height and cross-section beginning at a level at least substantially below the upper surface of the bed and extending upwardly that the gaseous material issuing from the column is reduced in velocity to a velocity below the bed disruption velocity, withdrawing gaseous material from the disengaging zone at a level above the bed surface, passing a confined compact stream of granular solids from the surge zone downwardly onto the upper surface of the bed in the disengaging zone, and continuously removing granular solids from the lower section of the bed in the disengaging zone and passing the solids so removed as a compact stream into the lower pressure zone.

9. A method for transferring granular solids upwardly from a high pressure zone to a lower pressure zone, which comprises: maintaining a substantially compact bed of granular solids within a confined disengaging zone at a level above the lower pressure zone, maintaining said disengaging zone at about the pressure in said lower pressure zone, continuously elevating granular solids as a compact column upwardly from said high pressure zone into said disengaging zone and discharging said column into said disengaging zone at a level beneath the upper surface of the bed, maintaining the length of said column such that gaseous material passes upwardly from the high pressure zone through said stream with the granular solids and issues from said column at a velocity sufficient to disrupt the bed at least around the outer edges of the discharge end of said column, removing gaseous material from the disengaging zone at a level above the bed, preventing disruption of the bed by maintaining the depth and cross-section of the bed beginning at a level substantially below its upper surface such that the velocity of the gaseous material is reduced to a velocity below the bed disruption velocity at a level substantially below the upper surface of the bed, removing granular solids the upper surface of the bed, removing granular solids as a confined compact stream from the lower section of the bed, removing a portion of the granular solids from the stream and passing said portion onto the upper surface of the bed in the disengaging zone and passing the remainder of the stream into the lower pressure zone.

10. A method for transferring granular solids from a high pressure zone to a lower pressure zone, which comprises: maintaining a compact bed of granular solids within a confined disengaging zone maintained at about the pressure of the lower pressure zone, maintaining a substantially compact seal leg of granular solids from the high pressure zone to the disengaging zone, terminating the seal leg on a downwardly facing end beneath the upper surface of the bed in the disengaging zone, maintaining the length of the seal leg such that gaseous material flows from the high pressure zone through the seal leg and issues therefrom at a velocity at least around the lower edges of the seal leg at a velocity sufficient to disrupt the bed, removing gaseous material at a level above the upper surface of the bed through a foraminous partition pervious to gas but impervious to the granular solids, preventing disruption of the bed by maintaining the bed of sufficient height and cross-section to reduce the gaseous velocity below the bed disruption velocity at a level substantially below the upper surface of the bed, supplying granular solids as a compact stream to the upper surface of the bed, maintaining a confined surge space at the upper end of said stream and maintaining within said surge space a second bed of granular solids, the length of said stream being such that should the pressure in the disengager become equal to that in the high pressure zone gaseous material would flow upwardly through the stream and issue therefrom at a velocity sufficient to empty the disrupted stream, preventing such disruption by providing sufficient height and cross-section of said second bed that said gaseous material would be reduced in velocity below the bed disruption velocity, supplying granular solids to the upper end of said second bed, removing granular solids from the lower end of said first bed through an outlet passage positioned to draw granular solids preferentially from said seal leg so that continuous flow of granular solids through the seal leg occurs, passing the material so withdrawn into the lower pressure zone, baffling the first granular solids bed in the area between the lower end of the seal leg and the upper end of the outlet passage to cause the outlet passage to draw granular solids primarily from the seal leg rather than the upper portion of the first bed above the seal leg lower end while providing for a minor amount of granular solids withdrawal from said upper section of the first bed through the outlet.

11. In a continuous hydrocarbon conversion system wherein granular contact material is continuously cycled between a confined reaction zone wherein the contact material as a compact bed contacts fluid hydrocarbons to effect their conversion at a high pressure and a regeneration zone wherein the contact material is reconditioned at a lower pressure than that in the reaction zone, the improved method of transferring the contact material from the lower end of the reaction zone to the upper end of the regeneration zone, which comprises: maintaining a substantially compact bed of granular contact material within a confined disengaging zone maintained above the regeneration zone, passing granular contact material from the lower end of the reaction zone upwardly as a substantially compact column, discharging into the disengaging zone at a level substantially below the surface of the bed therein, injecting an inert seal gas at a pressure slightly in excess of the pressure in the reaction zone into said column at a point adjacent its high pressure end whereby seal gas will flow upwardly through said column together with the contact material, maintaining the length of said column such that seal gas issues therefrom at a velocity at least around the outlet end of the column sufficient to disrupt the bed of contact material in the disengaging zone, preventing such disruption by maintaining the bed beginning at a level at least substantially below its upper surface of sufficient cross-section to reduce the velocity of the seal gas below the bed disruption velocity, removing seal gas from the disengaging zone at a level above the bed, and removing contact material from the lower end of the disengaging zone and passing the contact material so removed into the regeneration zone.

12. In a continuous hydrocarbon conversion system wherein granular contact material is continuously cycled between a high pressure reaction zone and lower pressure regeneration zone, passing through each of said zones as a substantially compact column, the improved method of transferring granular solids from the reaction zone to the regeneration zone, wihich comprises: maintaining a substantially compact bed of contact material within a confined disengaging zone, maintaining a seal leg of contact material extending from the lower section of the reaction zone into the disengaging zone and terminating at a level substantially below the upper surface of the bed, said seal leg having a downwardly facing outlet end which terminates at a level not higher than its inlet end, injecting an inert seal gas at a pressure slightly in excess of the pressure in the reactor into the seal leg adjacent its inlet end whereby seal gas will flow through said seal leg to the disengaging zone, maintaining the length of the seal leg such that the seal gas will issue from the seal leg at a velocity at least around its discharge end sufficient to disrupt the bed of contact material, removing seal gas from the disengaging zone at a level above the upper surface of the bed, preventing disruption of the bed by providing sufficient height and cross-section of the bed above the outlet end of the seal leg to reduce the gas velocity below the bed disruption velocity at a level substantially below the upper end of the bed, supplying granular contact material to the upper end of the bed, and withdrawing granular contact material from the lower end of the bed and passing the material so withdrawn into the regeneration zone.

13. In a continuous gas-solid contacting process wherein granular solid contact material is cycled at a substantially constant rate between a high pressure zone and a substantially lower pressure zone, the improved method for transferring granular solids from a point on the high pressure zone to a point on the lower pressure zone at a substantially higher elevation than the point on the high pressure zone, which comprises: maintaining a compact bed of contact material confined within a disengaging zone at a level above said point on said lower pressure zone, said disengaging zone being at about the pressure of the lower pressure zone, continuously passing contact material as a confined elongated substantially compact column upwardly from said high pressure zone into said disengaging zone and discharging said column at a level in said disengaging zone beneath the upper surface of the bed therein, said column being sufficiently short that the calculated head of a compact column of contact material equal in height to the elevational difference between the points of entry thereto and exit therefrom is less than the pressure differential between the high pressure zone and the disengaging zone whereby gaseous material will flow through the column from the high pressure zone to the lower pressure zone and issue from said column at a velocity sufficient to disrupt the bed at least around the discharge edges of the column, removing gaseous material from the disengaging zone at a level above the bed and at a rate sufficient to maintain the pressure in the disengaging zone about equal to that in the lower pressure zone, preventing disruption of the bed by maintaining sufficient height and cross-section of the bed that the velocity of the gaseous material flowing through the bed is reduced below the boiling velocity at a level beginning at least a substantial distance below the bed surface, removing a stream of contact material from the lower end of said bed to the exterior of the disengaging zone, splitting the contact material so removed in a major portion and a minor portion, passing the major portion to the lower pressure zone, passing the minor portion to a surge zone maintained above the disengaging zone, passing contact material from the lower end of said surge zone as a compact stream discharging onto the surface of the bed in the disengaging zone, baffling the flow of contact material in said bed so that the stream removed from the bed draws its major fraction from the portion of the bed supplied by said column rather than the portion of the bed which is supplied by the stream from the surge zone and only a minor fraction from the portion of the bed supplied by the stream from the surge zone, and regulating the rate of contact material supply to the surge zone to be not less than the amount of contact material drawn by the outlet stream from the bed from that portion of the bed supplied by the stream from the surge zone.

14. A continuous catalytic conversion process wherein granular catalyst is continuously cycled between a high pressure reaction zone and a lower pressure regeneration zone, which comprises: gravitating granular catalyst downwardly through a confined high pressure reaction zone as a substantially compact moving column, passing hydrocarbon reactants through the bed to effect their conversion and withdrawing products of conversion from the reaction zone, maintaining a confined compact bed of granular catalyst within a separate confined disengaging zone, passing spent granular catalyst from the lower section of the reaction zone into the disengaging zone as a confined seal leg of catalyst of substantially less cross-section than the reaction zone and the disengaging zone, injecting inert seal gas into the leg adjacent the catalyst inlet end at a pressure slightly in excess of that maintained in the reaction zone, maintaining the length of said leg such that seal gas will flow through the leg and discharge therefrom at a velocity sufficient to disrupt the bed of catalyst in the disengaging zone, preventing such disruption by maintaining a portion of said bed above the outlet end of said leg, said portion being of sufficient height and cross-section beginning at a level substantially below its upper end that the velocity of the seal gas as it flows upwardly through the bed is reduced to below the bed disruption velocity at a level substantially below the upper end of the bed, passing granular solids from the lower section of the disengaging zone into the upper section of a confined regeneration zone maintained at a pressure substantially below that in the reaction zone, removing seal gas from the disengaging zone at a level above the bed and at a rate sufficient to maintain the pressure in the disengaging zone at about the pressure of the regeneration zone, gravitating the spent catalyst through the regeneration zone as a substantially compact column and contacting said catalyst therein with an oxygen-containing gas to burn the contaminants deposited on the catalyst in the reaction zone and thereby recondition the catalyst for re-use in the reaction zone, removing the regenerated catalyst from the regeneration zone, passing a major portion of the regenerated catalyst to the reaction zone and gravitating the remainder into the disengaging zone onto the surface of the bed therein, and cooling the portion of the catalyst supplied to the disengaging zone to a temperature suitable to adsorb any hydrocarbon material which may vaporize from the catalyst in the disengaging zone.

15. An apparatus for transferring granular solids from a high pressure vessel to a lower pressure vessel which comprises in combination: members defining a passageway for granular solids of less cross-section than either of said vessels and extending from said high pressure vessel and terminating on a downwardly facing open discharge end centrally within said lower pressure vessel, said passageway being of such length that when filled with granular solids at the pressure differential between the two vessels gaseous material will flow from the high pressure vessel through said passageway and issue therefrom at a velocity in excess of the boiling velocity of the granular solids, a plurality of vertically spaced-apart upright frusto-conical shaped baffles beneath the lower end of said passageway in said lower pressure vessel, said baffles having central openings therethrough at least of the size of the lower end of said passageway and in vertical alignment with the lower end of said passageway and having sides at angles with the horizontal greater than 30 degrees, said baffles being spaced apart so that a line extending outwardly at an angle with the horizontal of about 75 degrees from the inside edge of any baffle below the uppermost will intersect the baffle next above and not pass beyond it, a granular solids draw-off conduit with inlet vertically directly beneath the discharge end of said passageway and the openings in said baffles, a line drawn outwardly at an angle of 75 degrees with the horizontal from the lower edge of said inlet intersecting the lowermost of said baffles, members defining a source of granular solids supply situated above the lower pressure vessel, a supply conduit extending from said source of supply in the upper section of said lower pressure vessel and terminating therein at a level above the lower end of said passageway, said latter level being such that a bed of granular solids is formed by solids issuing from said supply conduit above the lower end of said passageway of sufficient height and cross-section to reduce the velocity of the gas which issues from said passageway below the boiling velocity as it passes upwardly through said bed, and a conduit for the removal of gaseous material extending from said lower pressure vessel at a level above the lower end of said supply conduit.

References Cited in the file of this patent

UNITED STATES PATENTS

| | | |
|---|---|---|
| 2,430,669 | Crowley | Nov. 11, 1947 |
| 2,436,780 | Simpson | Feb. 24, 1948 |
| 2,451,924 | Crowley | Oct. 19, 1948 |
| 2,531,192 | Bergstrom | Nov. 21, 1950 |
| 2,656,306 | Bergstrom | Oct. 20, 1953 |
| 2,684,873 | Berg | July 27, 1954 |
| 2,724,619 | Berg | Nov. 22, 1955 |